United States Patent
Doshi et al.

(10) Patent No.: US 9,060,301 B2
(45) Date of Patent: Jun. 16, 2015

(54) PARSER TO DYNAMICALLY GENERATE PREFERRED MULTI-MODE SYSTEM SELECTION ENTRIES

(71) Applicant: w2bi, Inc., South Plainfield, NJ (US)

(72) Inventors: Dinesh Doshi, South Plainfield, NJ (US); Deepa Jagannatha, Somerset, NJ (US); Ramesh Parmar, Scotch Plains, NJ (US)

(73) Assignee: w2bi, Inc., South Plainfield, NJ (US)

( * ) Notice: Subject to any disclaimer, the term of this patent is extended or adjusted under 35 U.S.C. 154(b) by 0 days.

(21) Appl. No.: 13/629,042

(22) Filed: Sep. 27, 2012

(65) Prior Publication Data
US 2013/0078996 A1    Mar. 28, 2013

Related U.S. Application Data

(60) Provisional application No. 61/539,788, filed on Sep. 27, 2011.

(51) Int. Cl.
*H04W 24/00* (2009.01)
*H04W 24/06* (2009.01)
*H04W 48/18* (2009.01)
*H04W 88/06* (2009.01)

(52) U.S. Cl.
CPC ............ *H04W 24/06* (2013.01); *H04W 48/18* (2013.01); *H04W 88/06* (2013.01)

(58) Field of Classification Search
USPC ............... 455/426.1, 552.1, 435.2, 418–420, 455/423–425, 557–558
See application file for complete search history.

(56) References Cited

U.S. PATENT DOCUMENTS

| | | | |
|---|---|---|---|
| 6,587,671 B1 * | 7/2003 | Kanago et al. | 455/67.11 |
| 7,606,918 B2 | 10/2009 | Holzman et al. | |
| 7,668,508 B2 * | 2/2010 | Zheng et al. | 455/41.2 |
| 7,809,369 B2 | 10/2010 | Parmar et al. | |
| 8,406,755 B2 * | 3/2013 | Liu | 455/423 |
| 8,483,759 B2 * | 7/2013 | Shi et al. | 455/558 |
| 2003/0162580 A1 | 8/2003 | Cousineau et al. | |
| 2008/0020755 A1 * | 1/2008 | Liu et al. | 455/432.1 |
| 2008/0058057 A1 | 3/2008 | Lau et al. | |
| 2011/0013559 A1 * | 1/2011 | Marin | 370/328 |
| 2013/0282334 A1 | 10/2013 | Diperna et al. | |

\* cited by examiner

*Primary Examiner* — Brandon Miller

(57) ABSTRACT

Disclosed is a method of dynamically parsing MLPL, MSPL, HPLMN, EHPLMN, PLMN, ePRL and the like lists. Each of the parsed entries is used to create simulated network conditions (for example, MCC/MNC for 3GPP network, SID/Sector ID for 3GPP2 networks) for verifying the device behavior through automation.

17 Claims, 3 Drawing Sheets

MLPL List

| MCC | MNC | MSPL_ID | SYS_TYPE |
|---|---|---|---|
| MCC1 | MNC1 | 1 | CDMA |
| MCC2 | MNC2 | 2 | LTE |
| MCC3 | MNC3 | 3 | GSM |
| MCC4 | MNC4 | 4 | EVDO |
| MCC5 | MNC5 | 5 | CDMA/EVDO |
| MCC6 | MNC6 | 6 | LTE |
| MCC7 | MNC7 | 7 | GSM |

MSPL_ID:1

| SYS_TYPE | PRI_CLASS | SYS_PRI | HIGHER_PRI_SRCH_TIME |
|---|---|---|---|
| EUTRAN | Home Only | more | 64 |
| cdma2000 HRPD | Home Only | more | 8 |
| Cdma2000 1x | Any | more | 8 |
| UTRAN | Home + Preferred | more | 8 |
| GSM | Any | same | 2 |

MSPL_ID:2

| SYS_TYPE | PRI_CLASS | SYS_PRI | HIGHER_PRI_SRCH_TIME |
|---|---|---|---|
| EUTRAN | Home Only | more | 64 |
| cdma2000 HRPD | Home Only | more | 8 |
| Cdma2000 1x | Home | more | 8 |
| UTRAN | Home + Preferred | more | 8 |
| GSM | Any | same | 2 |

MSPL_ID:3

| SYS_TYPE | PRI_CLASS | SYS_PRI | HIGHER_PRI_SRCH_TIME |
|---|---|---|---|
| EUTRAN | Home Only | more | 64 |
| cdma2000 HRPD | Home Only | more | 8 |
| Cdma2000 1x | Any | more | 8 |
| UTRAN | Any | more | 8 |
| GSM | Any | same | 2 |

Figure 2

PARSER TO DYNAMICALLY GENERATE PREFERRED MULTI-MODE SYSTEM SELECTION ENTRIES

CROSS-REFERENCE TO RELATED APPLICATIONS

In accordance with 37 C.F.R. 1.76, a claim of priority is included in an Application Data Sheet filed concurrently herewith. Accordingly, under 35 U.S.C. §119(e), 120, 121, and/or 365(c) the present invention claims priority to U.S. Provisional Application No. 61/539,788, filed Sep. 27, 2011, entitled "Parser to Dynamically Generate Preferred Multi-Mode System Selection Entries", and is related to U.S. patent application Ser. No. 11/446,451, filed Jun. 2, 2006, now U.S. Pat. No. 7,809,369, issued Oct. 5, 2010, entitled "Adaptive Testing of System Acquisition and Roaming Characteristics for CDMA Wireless Communication Systems". The contents of each of the above referenced applications are herein incorporated by reference in its entirety.

FIELD OF THE INVENTION

The present invention relates to a system and method of testing devices for the multimode system selection capability in an automated mode. More particularly, the present invention includes the automatic parsing of all the system entries from the Universal Integrated Circuit Card (UICC) card in order to produce various network conditions to verify system selection behavior.

BACKGROUND OF THE INVENTION

System selection is one of the first tasks a device must perform upon power-up. Its implementation impacts how long a user must wait before attaching to a network to make a voice or a data call. Therefore the operators must make sure that this process is seamless from a user's perspective. With most of the operators migrating from the existing 2G/3G to 4G networks, it becomes challenging to verify the multimode system selection capability of the mobile device.

The mobile devices that belong to 3GPP technologies like GSM/GPRS/WCDMA/HSPA use a PLMN based system selection whereas the 3GPP2 based mobile devices that belong to CDMA 2000/EV-DO use a PRL/ePRL based system selection. With 4G LTE coming into picture the operators need to have a seamless migration plan in supporting these technologies without user interruption.

A UICC may contain several applications, making it possible for the same smart card to give access to both 3GPP and non-3GPP networks. 3GPP has approved some important features in the USIM to enable efficient network selection mechanisms. With the addition of CDMA2000 and HRPD access technologies into the PLMN, the USIM PLMN lists now enable roaming selection among CDMA, UMTS, and LTE access systems. Taking advantage of the standards, USIM now stores mobility management parameters for SAE/LTE.

The UICC cards must be capable of supporting multimode technologies for a seamless system selection. Therefore the devices with these capabilities need to be tested in the lab before they are commercially released into the market. And testing these devices by providing typical scenarios would take a long time if done manually.

Currently the mobile devices that belong to CDMA 2000/EVDO networks require Preferred Roaming List (PRL) to acquire the right system. Whereas the mobile devices that belong to GSM/UMTS/LTE networks use PLMN list to acquire the right system.

When a mobile device supports multi-mode capability that works across all standards the device needs a better system selection process to choose the right network. The MMSS related information like MLPL, MSPL, PRL/ePRL and PLMN identities combined together provides the device all the relevant information for it to decide which would be the right system for it to acquire. It is clear that a device's ability to acquire the proper system is paramount not only for user satisfaction, but also for the carrier to provide the most cost effective service. Thus, proper testing of system acquisition and section of the PLMN & ePRL order is of utmost importance.

SUMMARY OF THE INVENTION

The present invention discloses an art of testing devices for the multimode system selection capability in an automated mode. This also involves the automatic parsing of all the system entries from the UICC card produce various network conditions to verify system selection behavior.

Accordingly, it is an objective of the instant invention to implement a system and method of testing mobile stations in accordance with the right values of PLMN/MSPL/MLPL/ePRL on the UICC.

It is another objective of the instant invention to implement a system and method of testing 3GPP2 and/or 4G multimode devices for a multimode system selection capability in an automated mode. The method includes receiving MLPL, MSPL, HPLMN, EHPLMN, PLMN, and ePRL and etc.

It is a further objective of the instant invention to implement a method of automatic parsing of all system entries from a UICC card.

It is yet another objective of the instant invention to implement a method of producing parameters for different network conditions.

It is a still further objective of the instant invention to a method of configured network simulation within appropriate parameters.

It is also an objective of the instant invention to automatically verify system selection behavior under identified conditions.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 2 is a diagram illustrating an exemplary system of MLPL linked to MSPL.

DETAILED DESCRIPTION OF THE INVENTION

Figure 1:
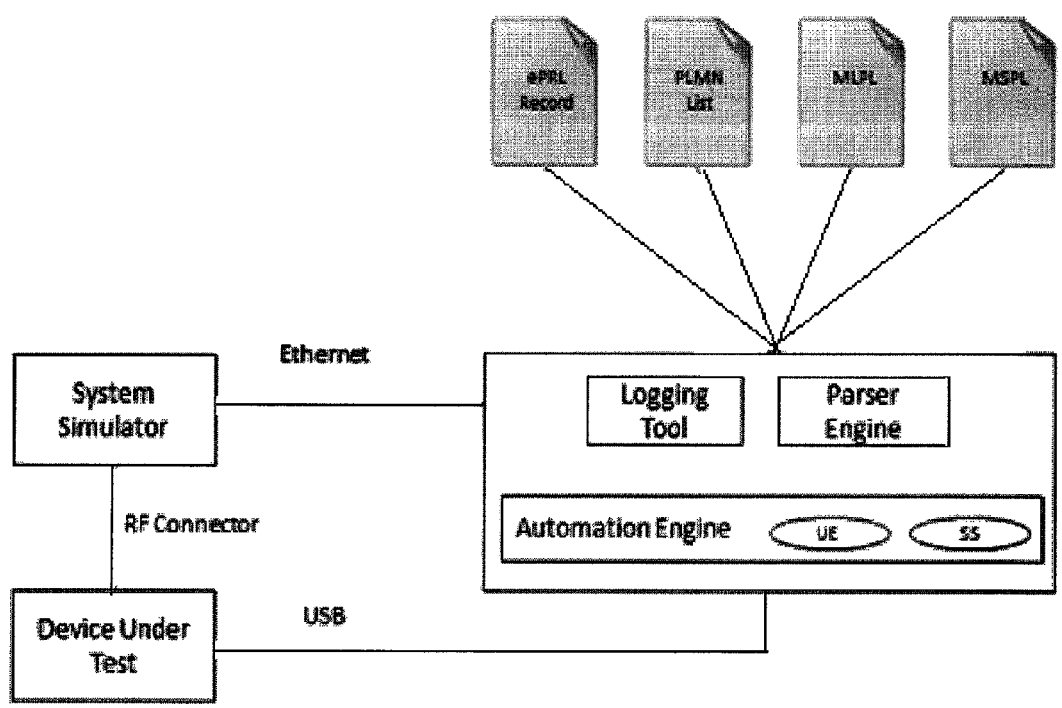
FIG. 1 is a diagram illustrating system simulated testing 4g Multimode devices for multimode system selection capability in an automated mode.
Figure 3:
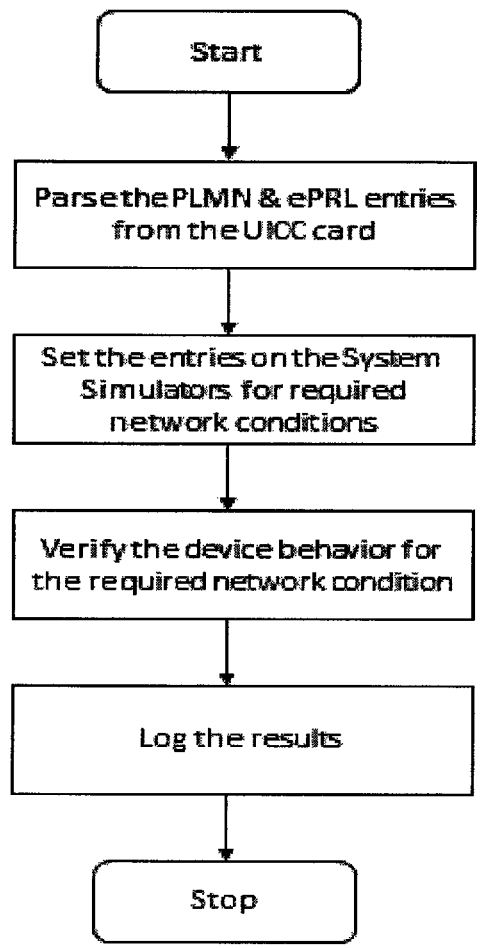
FIG. 3 is a flow diagram that illustrates a method of verifying device behavior for a required network condition.

While the instant invention is susceptible of embodiment in various forms, there is shown in the drawings and will hereinafter be described a presently preferred, albeit not limiting, embodiment with the understanding that the instant disclosure is to be considered an exemplification of the instant invention and is not intended to limit the invention to the specific embodiments illustrated.

Mobile devices with Multi-Mode capability, work seamlessly across different standards (CDMA/GSM/UMTS/LTE). The process of selecting the right system when the device receives signals from all the different networks is called as Multi-Mode System Selection (MMSS).

Now referring to the figures in general, the current invention discloses the art of testing 3GPP2 or 4G Multimode devices for the multimode system selection capability in an automated mode. This also involves the automatic parsing of all the system entries from the UICC card, producing parameters for different network conditions, configuring network simulators with appropriate parameters and finally verifying the system selection behavior under respective condition in an automated fashion.

When the test is executed, the user will select the areas to be tested through the GUI. Based on the select, the application will control the required number of emulators and set the needed RF conditions. The test suite employs base station emulation hardware to create the RF conditions stipulated in the test case. The exact RF conditions will be based on the entries in the test PLMN/MSPL/MLPL/ePRL list. Once all the system parameter information is extracted from the file, all the combinations of systems are created as per the requirements of each test case. The test is executed, with the automation scripts setting the parameters on the BSE and managing the test device as it is programmatically controlled through the test procedures.

The system consists of System Simulators (SS) capable of simulating required network conditions and the automation engine to control the SS and Device under Test (DUT). The automation engine has the logging tool and parser engine. The parser engine takes care of parsing the PLMN, MSPL, MLPL and ePRL entries from the UICC card. The logging tool logs the results of the device behavior under different network conditions.

The MMSS procedure is assisted by pre-defined records called MLPL and MSPL which contain location specific information and system priorities respectively. The parser engine encompasses the core intelligence of reading and parsing the PLMN, MLPL, MSPL and ePRL entries from the UICC card. The parser engine dynamically creates list of entries based on the information parsed from these records which will determine the mobile station's behavior in scenarios such as Power-UP, Empty MRU list, Cell Reselection upon system loss, System selection based on the priority etc. These scenarios will be automated by the Automation Engine. Based on the UE behavior under the scenario tested the logging tool will provide the analysis of the result. The parser engine will parse the entries in accordance with the Multi-Mode System Selection Procedure.

MMSS Location Associated Priority List (MLPL) is a list of groupings based on location specific information. MLPL allows the base station to specify the MMSS System Priority List to be used in a location grouping. The appropriate technology priorities to use are obtained by following a link from the MLPL to a specific portion of the MSPL. The MLPL and the MSPL are used together for the purposes of selecting a supported cellular system based on the two priority lists.

MMSS System Priority List (MSPL) defines a set of technology priorities/rankings for a particular Location Group(s). The MSPL assists a multimode mobile station in selecting a system. After acquisition, the multimode mobile station searches for systems having a higher priority in the MSPL after a time that may be specified by HIGHER_PRI_SRCH_TIMER. There can be only one MSPL record associated with a location grouping specified in an MLPL record; however, any number of MLPL records may have the same MSPL_INDEX.

Preferred Roaming List (PRL) is a database that assists the mobile in the acquisition and selection of a serving CDMA network. The PRL is fundamental for operators since it is through the PRL that the home operator informs their mobile devices about systems that are permitted and any order of preference in the permitted systems and even about any systems that are prohibited.

Public Land Mobile Networks (PLMN) list contains the combination of Mobile Country Code (MCC) and Mobile Network Code (MNC). These PLMN identities are configured in the UICC card and the mobile device uses this list in choosing a right system.

Home PLMN: A PLMN where the Mobile Country Code (MCC) and Mobile Network Code (MNC) of the PLMN identity are the same as the MCC and MNC of the IMSI.

Equivalent Home PLMN: When the Home PLMN is included in the Equivalent PLMN list, the UE will treat the visited network as Home PLMN and will not do background scanning for Home PLMN. Hence, equivalent PLMNs is the main enabler of Shared Networks. Without an Equivalent PLMN list, the UE will search for Home PLMN and fall back to parent network immediately.

Equivalent PLMN list: List of PLMN entries in the EPLMN record of the UICC considered equivalent by the UE for cell selection, cell reselection, and handover.

When the device is turned ON it verifies the correct system and registers on the SS Test Scenarios can include Registration/Attach, Rescan/Reselection, System Loss Idle/Traffic, Forbidden/Negative etc.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of testing mum-mode devices for multi-mode system selection capability, said method comprising:
    parsing of system entries from a Universal Integrated Circuit Card (UICC) with respect to a plurality of attributes defined for multimode system selection (MMSS), wherein said system entries are generated in a multimode device under test (DUT) responsive to broadcast from a network simulator comprising base station emulation hardware;

producing parameters based upon said system entries for different network system modes as simulated by said network simulator;

configuring said network simulator with said parameters; and verifying system selection behavior under respective network system modes in an automated fashion.

2. The method of testing according to claim 1, wherein said plurality of attributes comprise Public Land Mobile Networks (PLMN), MMSS system priority List (MSPL), MMSS Location Associated priority List (MLPL), Home Plan Land Mobile Network (HPLMN), Equivalent Home Public Land Mobile Network (EHPLMN) and Enhanced Preferred Roaming List (ePRL), wherein said parsing is further performed by a parser engine coupled to the network simulator.

3. The method of testing according to claim 2 wherein said parser engine dynamically creates a list of said system entries based on the information parsed from records to determine multi-mode device behavior in scenarios including Power-up, Empty Most Recently Use (MR) list, Cell Reselection upon system loss, and System selection based on priority.

4. The method of testing according to claim 2 wherein said MMSS Location Associated Priority List (MLPL) is a data record containing location specific information.

5. The method of testing according to claim 2 wherein said MMSS system priority List (MSPL) is a data record containing system priorities.

6. The method of testing according to claim 1 wherein a user selects an area to be tested through a graphical user interface (GUI).

7. The method of testing according to claim 1 further comprising controlling a plurality of emulators and RF conditions.

8. The method of testing according to claim 7 wherein said RF conditions are generated using said base station emulation hardware.

9. The method of testing according to claim 7 wherein said RF conditions are based on the entries in test Public Land Mobile Networks (PLMN)/MMSS System Priority List (MSPL)/MMSS Location Associated Priority List (MLPL)/Enhanced Preferred Roaming List (ePRL) List.

10. The method of testing according to claim 1 wherein said parameters are extracted from a preprogrammed data file having combinations of systems created per the requirements of a test case.

11. The method of testing according to claim 1 wherein automatic scripts are used to set said parameters.

12. The method of testing according to claim 11 wherein said automatic scripts are used to set said parameters on said base station emulation hardware and on said multi-mode DUT programmatically controlled through test procedures.

13. The method of testing according to claim 1 wherein said multi-mode device is a 3GPP2 device.

14. The method of testing according to claim 1 wherein said multi-mode device is a 4G device.

15. The method of testing according to claim 1 wherein said different network system modes comprise a MCC/MNC for 3GPP network.

16. The method of testing according to claim 1 wherein said different network system modes comprise a SID/Sector ID for 3GPP2 network.

17. The method of testing according to claim 1 wherein said different network system modes are programmatically configured network simulators.

* * * * *